(12) United States Patent
Noguchi et al.

(10) Patent No.: US 6,930,876 B1
(45) Date of Patent: Aug. 16, 2005

(54) MULTILAYER CERAMIC CAPACITOR

(75) Inventors: Kazunori Noguchi, Tokyo (JP); Takako Hibi, Tokyo (JP); Mari Miyauchi, Tokyo (JP); Akira Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/043,265

(22) Filed: Jan. 27, 2005

(30) Foreign Application Priority Data

Jan. 30, 2004 (JP) .............................. 2004-024240

(51) Int. Cl.[7] .............................................. H01G 4/06
(52) U.S. Cl. .................. 361/311; 361/321.4; 361/321.5
(58) Field of Search ...................... 361/311–313, 321.1, 361/321.2, 321.3, 321.4, 321.5

(56) References Cited

U.S. PATENT DOCUMENTS

| 6,489,257 B1 * | 12/2002 | Hiramatsu et al. ........... 501/135 |
| 6,600,645 B1 * | 7/2003 | Lauf et al. .................... 361/311 |
| 6,606,238 B1 * | 8/2003 | Nakamura et al. ....... 361/321.2 |

FOREIGN PATENT DOCUMENTS

| JP | 5-62855 | * 3/1993 | ............ H01G 4/12 |
| JP | 2003-77761 | * 3/2000 | ............ H01G 4/30 |
| JP | 2000-277369 | * 10/2000 | ............ H01G 4/12 |
| JP | 2001-307939 | * 11/2001 | ............ H01G 4/12 |
| JP | 2003-100544 | * 4/2003 | ............ H01G 4/12 |
| JP | 2003-124049 | * 4/2003 | ............ H01G 4/12 |

* cited by examiner

Primary Examiner—Eric W. Thomas
(74) Attorney, Agent, or Firm—Oliff & Berridge, PLC

(57) ABSTRACT

A multilayer ceramic capacitor 1 having internal electrode layers 3 and internal dielectric layers 2 having thickness of at most 3.5 μm wherein; the internal dielectric layers 2 comprising dielectric particles contacting the internal electrode layers (contacting dielectric particles 2a) and dielectric particles not contacting the internal electrode layers (non-contacting dielectric particles 2b), and when an average particle size of an entire plural number of dielectric particles included in the internal dielectric layers 2 is D50, and standard deviation for particle size range of the contacting dielectric particles is σ, the multilayer ceramic capacitor satisfy the following equations; $D50 \leq 0.25$ μm and $\sigma \leq 0.14$. According to the present invention, multilayer ceramic capacitor 1 is provided wherein the capacitor is expected to have improved DC bias characteristic even when the internal dielectric layers 2 are made thinner.

2 Claims, 6 Drawing Sheets

MULTILAYER CERAMIC CAPACITOR

BACKGROUND OF THE INVENTION

1. Field of the Invention

The present invention relates to a multilayer ceramic capacitor.

2. Description of the Related Art

In recent years, in order for multilayer ceramic capacitor to miniaturize, obtain larger capacitance, reduce cost and obtain higher reliability, dielectric layers and internal electrode layers are made thinner.

Conventionally, it is known that dielectric particles are added to internal electrode layer paste forming internal electrode layer in order to restrain breaking by firing, sintering of base metal conductive materials such as Ni, etc. (see Japanese Patent Publication (A) No. 5-62855, Japanese Patent Publication (A) No. 2000-277369, Japanese Patent Publication (A) No. 2001-307939, Japanese Patent Publication (A) No. 2003-77761 and Japanese Patent Publication (A) No. 2003-100544). With the tendency of layers being thinner, the dielectric particles, together with Ni particles, are required to be fine.

However, when dielectric particles added to the internal electrode paste are made fine, particle growth of the dielectric particles is accelerated around the phase boundary of dielectric when firing. As dielectric layers are made thinner, throughout the dielectric layers, the ratio of dielectric particles located at a side contacting internal electrode layers become larger and that the particle growth of dielectric particles will have great influence. Consequently, there may be deteriorations in all kinds of characteristics of obtained multilayer ceramic capacitor such as tan δ, bias characteristic, temperature characteristic, reliability, etc.

As a solution to these problems, Japanese Patent Publication (A) No. 2003-124049 discloses techniques to control composition of additives to internal electrode layer paste and to control ratio of average particle sizes of dielectric particles contacting internal electrode layers and dielectric particles not contacting the internal electrode layers after firing, concentration ratio of components of additives, and core-shell ratio. According to said Japanese Patent Publication (A) No. 2003-124049, dielectric layers are possible to be thinner without deteriorating temperature characteristic, tan δ, and lifetime.

However, with the technique as in Japanese Patent Publication (A) No. 2003-124049, an improvement in bias characteristic was not sufficient and there was still a problem to be solved.

SUMMARY OF THE INVENTION

An object of the present invention is to provide a multilayer ceramic capacitor wherein an improvement in bias characteristic can be expected, even when internal dielectric layers (dielectric layers wherein each of the layers exists between a couple of internal electrode layer) are made thinner.

In order to achieve the above-mentioned object, according to the invention, a multilayer ceramic capacitor comprising internal electrode layers, dielectric layers having thickness of at most 3.5 μm is provided wherein, the dielectric layers comprising dielectric particles contacting the internal electrode layers (contacting dielectric particles) and dielectric particles not contacting the internal electrode layers (non-contacting dielectric particles), and when an average particle size of an entire plural number of dielectric particles included in the dielectric layers is D50, and standard deviation for particle size range of the contacting dielectric particles is σ, the capacitor satisfy the following Equations; D50≦0.25 μm and σ≦0.14.

Preferably, when an average particles size of the contacting dielectric particles is D50a, and ratio of contacting dielectric particles (coarse particles), having an average particle size which is at least 2.25 times larger than said D50a, existing in the contacting dielectric particles included in the dielectric layers is p, the multilayer ceramic capacitor satisfy p≦8.00%.

Multilayer ceramic capacitor according to the invention can be manufactured such as by following procedures. However, the manufacturing method of the multilayer ceramic capacitor of the invention is not limited to the following method.

The method is a manufacturing method of a multilayer ceramic capacitor comprising a step of firing multilayer body formed by using dielectric layer paste including dielectric material comprising main component material and sub-component material, and internal electrode layer paste comprising dielectric material for additives wherein, the dielectric material for additives include at least main component material for additives, the main component material for additives substantially has the same composition with main component material included in the dielectric material in dielectric layer paste, and the ignition loss of at most 6.20%.

Meaning of "substantially has the same composition group" as in above methods include not only when kinds of each element and composition molar ratio of said each element are entirely the same, but when kinds of each element are the same but composition molar ratio of said each element are somewhat different. As for the former case, for instance, when main component material included in dielectric material in dielectric layer paste is $(BaO)_m TiO_2$ (provided that $_m=1$), main component material for additives included in dielectric material for additives in internal electrode layer paste is $(BaO)_{m'} TiO_2$ (provided that $_{m'}=1$). As for the latter case, for instance, main component material is $(BaO)_m TiO_2$ (provided that $_m=1$), main component material for additives is $(BaO)_{m'} TiO_2$ (provided that $_{m'}=0.990$ to 1.050 or so).

Namely, by adjusting ignition loss of main component material for additives included in dielectric material for additives in internal electrode layer paste, existing state of dielectric particles composing dielectric layer after firing is controlled. Further details of the ignition loss will be described later.

With this method, dielectric material for additives include "at least main component material for additives", and may further include subcomponent material for additives.

With this method, at least main component material for additives included in dielectric material for additives and main component material included in dielectric material in dielectric layer paste substantially may be the same composition group. Therefore, when dielectric material for additives include subcomponent material for additives other than main component material for additives, (1) only main component material for additives, a portion of dielectric material for additives, and main component material included in the dielectric material in dielectric layer paste have substantially the same composition group. In other words, the composition of subcomponent material for additives, the remainder of dielectric material for additives, and the composition of the subcomponent material included in dielectric material in dielectric layer paste may be different. (2) All of the dielectric material for additives (as a matter of course, main component material for additives is included) may have substantially the same composition group with all of dielectric material (as a matter of course, main component material is included) in dielectric layer paste.

According to the invention, by making the internal dielectric layer thinner, a multilayer ceramic capacitor is provided wherein an improvement in bias characteristic can be expected.

BRIEF DESCRIPTION OF THE DRAWINGS

These and other objects and features of the present invention will be explained in further detail with reference to the attached drawings, wherein.

DESCRIPTION OF THE PREFERRED EMBODIMENTS

Below, the present invention will be explained based on the embodiments shown in the figures.

In the present embodiment, a multilayer ceramic capacitor having internal electrode layers and dielectric layers is exemplified to explain, wherein a plural number of the internal electrode layers and dielectric layers are stacked alternately.

Multilayer Ceramic Capacitor

Figure 1:
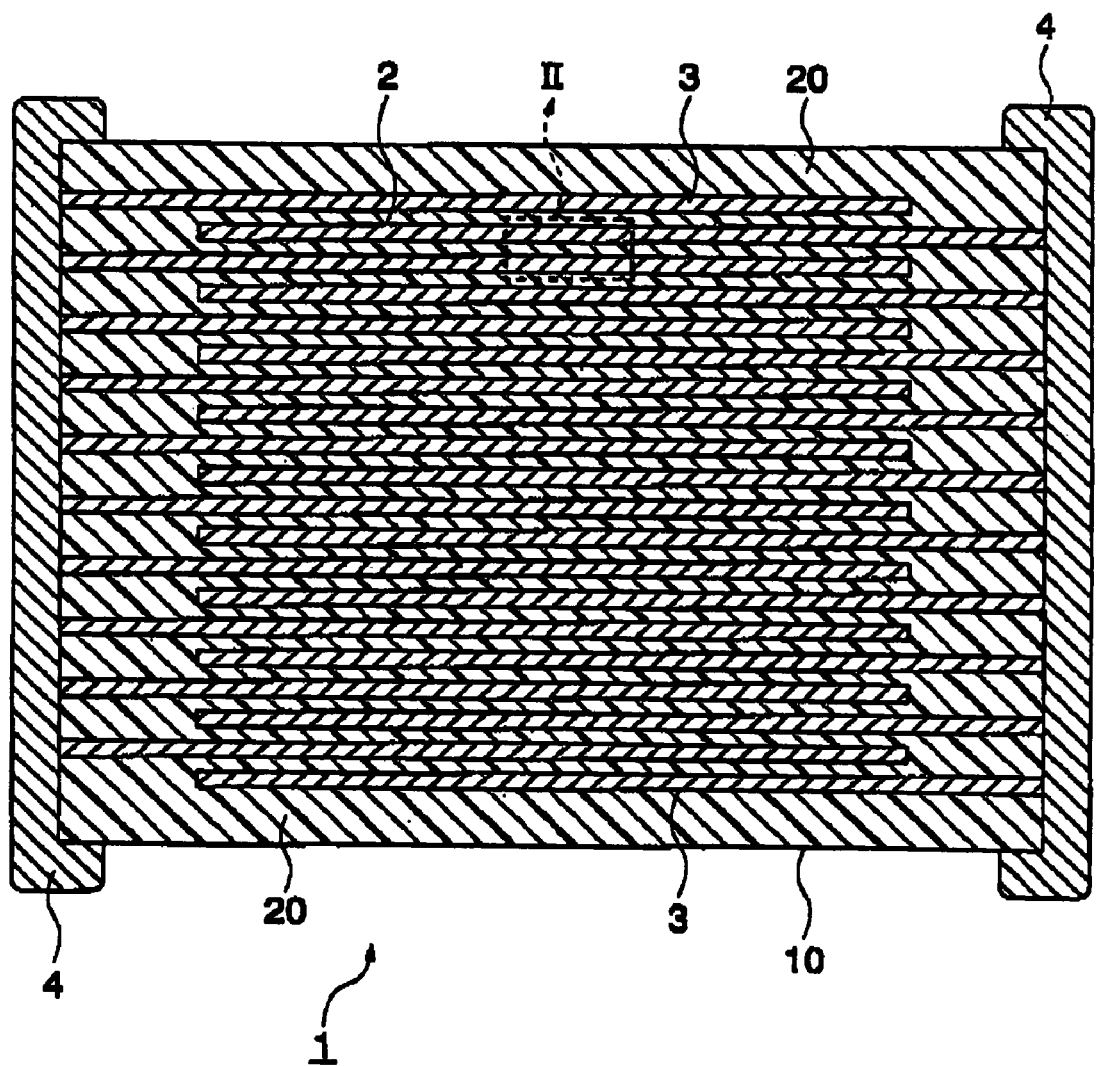
FIG. 1 is a schematic sectional view of a multilayer ceramic capacitor according to an embodiment of the present invention.

As shown in FIG. 1, a multilayer ceramic capacitor 1 according to an embodiment of the present invention has a capacitor device body 10 of a configuration of internal dielectric layers 2 and internal electrode layers 3 stacked alternately. At the two ends of the capacitor device body 10 are formed a pair of external electrodes 4 conductive with each of the internal electrode layers 3 alternately arranged inside the device body 10. The internal electrode layers 3 are stacked so that and faces thereof alternately protrude out to the surfaces of the two opposing ends of the capacitor device body 10. The pair of external electrodes 4 are formed at the two ends of the capacitor device body 10 and are connected to the exposed end faces of the alternately arranged internal electrode layers 3 to form a capacitor circuit.

The shape of the capacitor device body 10 is not particularly limited, but normally is made a rectangular parallelepiped. Further, the dimensions are also not particularly limited and may be made suitable dimensions in accordance with the application. Usually, however, they are (0.6 to 5.6 mm) long×(0.3 to 5.0 mm) wide×(0.3 to 1.9 mm) height or so.

In the capacitor device body 10, external dielectric layers 20 are arranged at both outer ends of the laminating internal electrode layers 3 and internal dielectric layers 2 and providing protection to inside of the capacitor device body 10.

Internal Dielectric Layer and External Dielectric Layer

The compositions of internal dielectric layers 2 and the outer dielectric layers 20 are not particularly limited in the invention and it may be composed of the following dielectric ceramic composition.

The dielectric ceramic composition according to the present embodiment may include barium titanate as a main component.

Sub components, included with the main component in the dielectric ceramic composition include one or more from Mn, Cr, Si, Ca, Ba, Mg, V, W, Ta, Nb, R(R is Y and at least one kind of rare-earth element), Si oxide and compound becoming oxide by firing. Addition of the sub component allows to have capacitor characteristic even firing under reduced atmosphere. As impurities, at least around 0.1 or less weight % of trace components such as C, F, Li, Na, X, P, S, Cl may be included. However, the compositions of the internal dielectric layers 2 nor the external dielectric layers 20 are not limited to the above composition.

In the present embodiment, it is preferable to use following compositions as the internal dielectric layers 2 and the external dielectric layers 20. As a main component, barium titanate is included and as sub component, magnesium oxide and oxides of rare-earth element are included. Further, as the other sub component, at least one from barium oxide and calcium oxide and at least one from silicon oxide, manganese oxide, vanadium oxide and molybdenum oxide are included. And, when barium titanate is converted to $BaTiO_3$, magnesium oxide to MgO, oxides of rare-earth element to $R_2O_3$, barium oxide to BaO, calcium oxide to CaO, silicon oxide to $SiO_2$, Manganese oxide to MnO, vanadium oxide to $V_2O_5$, and molybdenum oxide to $MoO_3$, with respect to 100 mole of $BaTiO_3$, MgO is 0.1 to 3 mole, $R_2O_3$ is more than 0 mole to at most 5 mole, BaO+CaO is 0.5 to 12 mole, $SiO_2$ is 0.5 to 12 mole, Mno is more than 0 mole to at most 0.5 mole, $V_2O_5$ is 0 to 0.3 mole, and $MoO_3$ is 0 to 0.3 mole.

The number of laminated layers, thickness, and other conditions of the internal dielectric layers 2 may be suitably determined in accordance with the object or application. In the present embodiment, the thickness of internal dielectric layers 2 is made thinner to preferably at most 3.5 μm, more preferably at most 2.5 μm, the most preferably at most 2.0 μm. The thickness of the external dielectric layer 20 is around 50 μm to several hundred micrometers or so.

Figure 2:
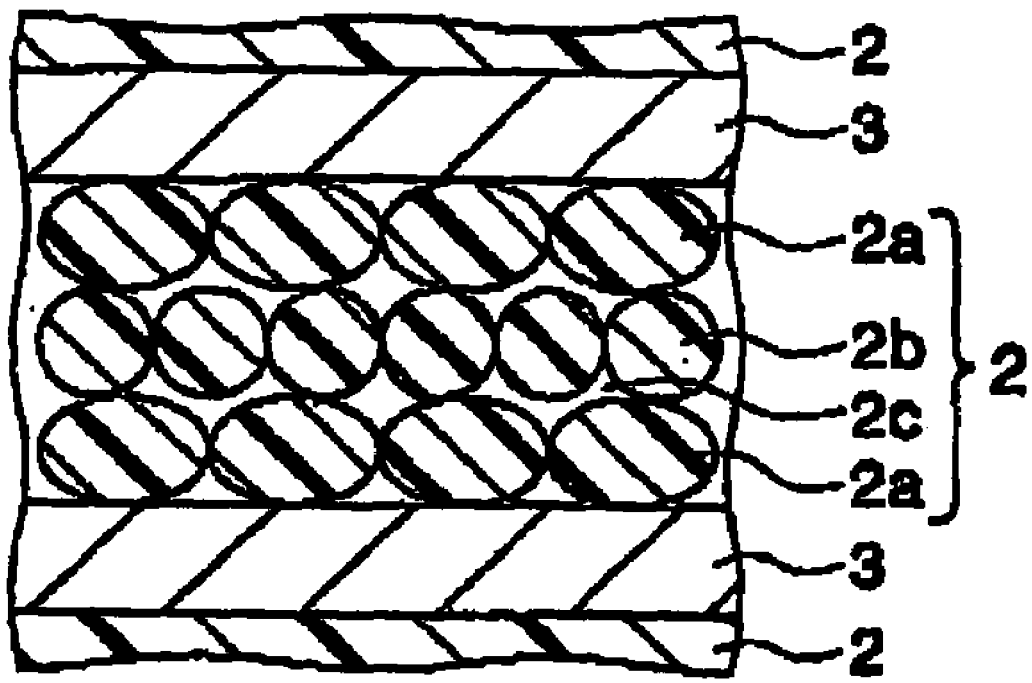
FIG. 2 is an enlarged sectional view of main portion of dielectric layer as shown in FIG. 1.

As shown in the FIG. 2, internal dielectric layers 2 include a plural number of dielectric particles and the plural number of dielectric particles at least include dielectric particles (contacting dielectric particles) 2a contacting the internal electrode layers 3, dielectric particles (non-contacting dielectric particles) 2b not contacting the internal electrode layer, and particle phase 2c. The contacting dielectric particle 2a only contact to one side of a pair of internal electrode layers 3 inserting an internal dielectric layer 2 which include the contacting dielectric particles 2a, and do not contact to both sides of the pair of internal electrode layers 3.

Here, an average particle size of an entire plural number of dielectric particles is D50, standard deviation for particle size range of contacting dielectric particles 2a is σ, and when an average particles size of the contacting dielectric particles 2a is D50a, and ratio of contacting dielectric particles (coarse particles), having an average particle size which is at least 2.25 times larger than said D50a, existing in contacting dielectric particles $2a$ included in the internal dielectric layers 2 is p. According to the present embodiment, D50 satisfies the following equations; D50≦0.25 μm, preferably D50≦0.190 μm, and the most preferably D50≦0.180 μm. Excessively large value of D50 causes inconveniences such as deterioration in reliability. The lower limit of D50 is, viewed in securing dielectric constant e, preferably 0.100 μm, more preferably 0.120 μm. Here, D50 indicates an average particle size of contacting dielectric particles $2a$ and non-contacting dielectric particles $2b$ in internal dielectric layers 2 (a portion contributes to capacitance) inserted between internal electrode layers 3. Said average particle size is an average particle size not considering dielectric particles in external dielectric layers 20, a portion not contribute to capacitance.

Further, a satisfy the following equations; σ≦0.14, preferably σ≦0.125, and the most preferably σ≦0.120. Excessively large value of a causes inconveniences such as deterioration in bias characteristic and reliability or so. As lower limit of σ, it is the lower the better.

According to the present invention, it is preferable that p satisfy the following equations; p≦8.00%, preferably p≦4.00%, and the most preferably p≦3.00%. Excessively large value of p causes inconveniences such as deterioration in bias characteristic and reliability or so. As lower limit of p, it is the lower the better.

Particle phase $2c$ is normally composed of oxides of materials composing dielectric material or internal electrode materials, oxides of specially added materials or oxides of materials mixed as impurities during the process.

Internal Electrode Layers

Internal electrode layers 3 as shown in the FIG. 1, is composed of base metal conductive materials that substantially act as electrodes. As the base metal used as conductive material, Ni or a Ni alloy is preferable. As the Ni alloy, an alloy of at least one element selected from Mn, Cr, Co, Al, Ru, Rh, Ta, Re, Os, Ir, Pt and W, and Ni is preferable. The content of Ni in the alloy is preferably at least 95 wt %. Note that the Ni or Ni alloy may also include various trace components such as P, C, Nb, Fe, Cl, B, Li, Na, K, F, S in amounts of not more than 0.1 wt % or so.

In the present invention, the thickness of the internal electrode layers 3 are made thinner, preferably 2.0 μm or less, more preferably 1.2 μm or less.

External Electrodes

As external electrodes 4 as shown in FIG. 1, normally at least one element from Ni, Pd, Ag, Au, Cu, Pt, Rh, Ru, Ir, or their alloys may be used. Normally, Cu, an Cu alloy, Ni, an Ni alloy, Ag, an Ag-Pd alloy, or an In-Ga alloy or so are used. The thickness of the external electrodes 4 may be suitably determined in accordance with application etc., but normally it is preferably 10 to 200 μm or so.

Methods to Produce Multilayer Ceramic Capacitor

Next, an example of multilayer ceramic capacitor 1 of the present embodiment is exemplified.

(1) First, dielectric layer paste that composes internal dielectric layers 2 and external dielectric layers 20 as shown in FIG. 1 after firing and internal electrode layer paste composing internal electrode layers 3 as shown in FIG. 1 after firing are prepared.

Dielectric Layer Paste

Dielectric layer paste is prepared by mixing dielectric material and organic vehicle.

As dielectric material is suitably selected from various compounds to be compound oxides or oxides by firing, such as carbonates, nitrates, hydroxides, organometallic compounds. The dielectric material is normally used in powder form wherein the average particle size is at most 0.4 μm, preferably around 0.1 to 3.0 μm.

The organic vehicle includes a binder and a solvent. The binder may be normal binders such as ethyl cellulose, polyvinyl butyral and acrylic resins. Also, the solvent used is not particularly limited and may be organic solvents such as terpineol, butyl carbitol, acetone, toluene, ethanol and xylene.

Dielectric layer paste can be formed by mixing dielectric material and vehicle wherein water-soluble binder is solved in water. The water-soluble binder is not particularly limited and it is such as polyvinyl alcohol, methyl cellulose, hydroxilic ethyl cellurose, water-soluble acrylic resin, emulsion etc.

The content of each component in dielectric layer paste is not particularly limited and, for instance, the dielectric layer paste can be prepared by including around 1 to 50 wt % of the solvent.

Additives suitably selected from all kinds of dispersant, plasticizer, dielectric, sub component compounds, glass frit, insulators etc. may be included in the dielectric layer paste. In case of adding the additives in dielectric layer paste, total content in the dielectric layer paste is preferably about 10 wt % or less.

Internal Electrode Layer Paste

In the present embodiment, the internal electrode layer paste is prepared by mixing conductive materials, dielectric material for additives and organic vehicle.

As the conductive materials, Ni, Ni alloys and their mixtures are used. The form of these conductive materials are not particularly limited and these may be spherical, (flakes), etc. and mixture thereof. As the particle diameter of conductive material, normally, when spherical, particles having an average particle diameter of 0.5 μm or less, preferably 0.01 to 0.4 μm or so is used. This is to realize highly advanced thinner layers. The conductive material is included in the internal electrode layer paste preferably by 35 to 60 wt %.

Dielectric material for additives are effective in containing internal electrode (the conductive material) to sinter in firing process.

In the present embodiment, dielectric materials for additives include main component material for an additive and subcomponent material for an additive. In the present embodiment, at least main component material for an additive included in dielectric materials for additives and main component material included in dielectric material in above dielectric layer paste substantially have the same composition system. Therefore, only main component material for an additive, which is a component of the dielectric material for an additive, and the main component material included in above dielectric layer paste may substantially have the same composition. And all of the dielectric material for additives and all of the dielectric material in dielectric layer paste may substantially have the same composition. In this way, at least making the compositions of main component material for additives and the main component the same, the composition in the dielectric layer does not change by diffusion from internal electrode layers to dielectric layers.

In the present embodiment, main component material for additive in dielectric material for additive having specific ignition loss is preferably used. By utilizing the main component material having specific ignition loss for additive, improvement in bias characteristic of capacitor 1 can be attempted. Ignition loss of main component material for additives is preferably 6.20% or less, and more preferably 5.00% or less. There is a tendency that when the ignition loss is excessively large, the improvement in bias characteristic-cannot be obtained. Further, as lower limit of ignition loss, it is the lower the better. Ultimately, 0(zero)% is ideal, however, generally it is difficult to manufacture such main component material for additives.

Here, the definition of "Ignition loss" is weight change rate after treated at 1200° C. and maintained for 10 minutes, compared to standard weight which is weight of main component material for additives that are heat treated (treatments of heating from room temperature to 1200° C. with rate of rise at 300° C./hour and retaining the temperature at 1200° C. for 10 minutes) at 200° C. The ignition loss may be due to the heat treatment causing adsorption material or hydroxyl group generally included in dielectric material to disappear.

An average particle size of main component material for additives can be the same with the particle diameter of main component material included in dielectric material in dielectric layer paste. Although, it is preferable to be more small and it is preferably 0.01 to 0.2 $\mu$m, more preferably 0.01 to 0.15 $\mu$m. The value of average particle size is known to have interrelation with specific surface area (SSA).

In comparison to the conductive material, dielectric material for additives (It may only be main component material for additives or it may include both main component material for additives and subcomponent material for additives. The following is the same unless specially mentioned.) is included in the internal electrode layer paste preferably 5 to 30 wt %, more preferably 10 to 20 wt %. When the content of the dielectric material for additives is excessively small, the containing effect of sintering the conductive material lowers, and when excessively large, continuity of internal electrode lowers. Namely, when the dielectric material for additives is excessively small or large, inconveniences may occur such that either of the case cannot maintain sufficient capacitance as a capacitor.

Organic vehicle contains binder and solvent.

Binder is such as ethyl cellulose, acrylic resins, polyvinyl butyral, polyvinyl acetal, polyvinyl alcohol, polyolefin, polyurethane, polystyrene or copolymers thereof are exemplified. Binder is included in the internal electrode layer paste, in comparison to mixed powders of conductive material and dielectric material for additives, is preferably 1 to 5 wt %. When the amount of binder is excessively small, the strength tends to decrease and when large, loading density of metals in the electrode pattern before firing tends to decrease and this may cause difficulty to maintain the smoothness in internal electrode layer 3 after firing.

As solvent, substances known in the art such as terpineol, dihydro terpineol, butyl carbitol, kerosene, etc. can all be used. The content of the solvent is, in comparison to the entire paste, preferably around 20 to 50 wt %.

Plasticizer may be included in the internal electrode paste. The solvent is exemplified by phthalate ester such as butyl benzyl phthalate(BBP), adipic acid, phosphorous acid, ester, glycol group etc.

(2) Next, by utilizing the dielectric layer paste and the internal electrode layer paste, green tip is prepared. When using the printing method, dielectric layer paste and internal electrode layer paste of prescribed pattern are printed and stacked on the carrier sheet, then, cut into prescribed form and exfoliated from the carrier sheet to prepare the green tip. When using the sheet method, green sheet obtained by forming dielectric layer paste on the carrier sheet by prescribed thickness is formed, and internal electrode layer paste is printed on the green sheet by prescribed form, then the sheet is stacked to be green tip.

Figure 3:
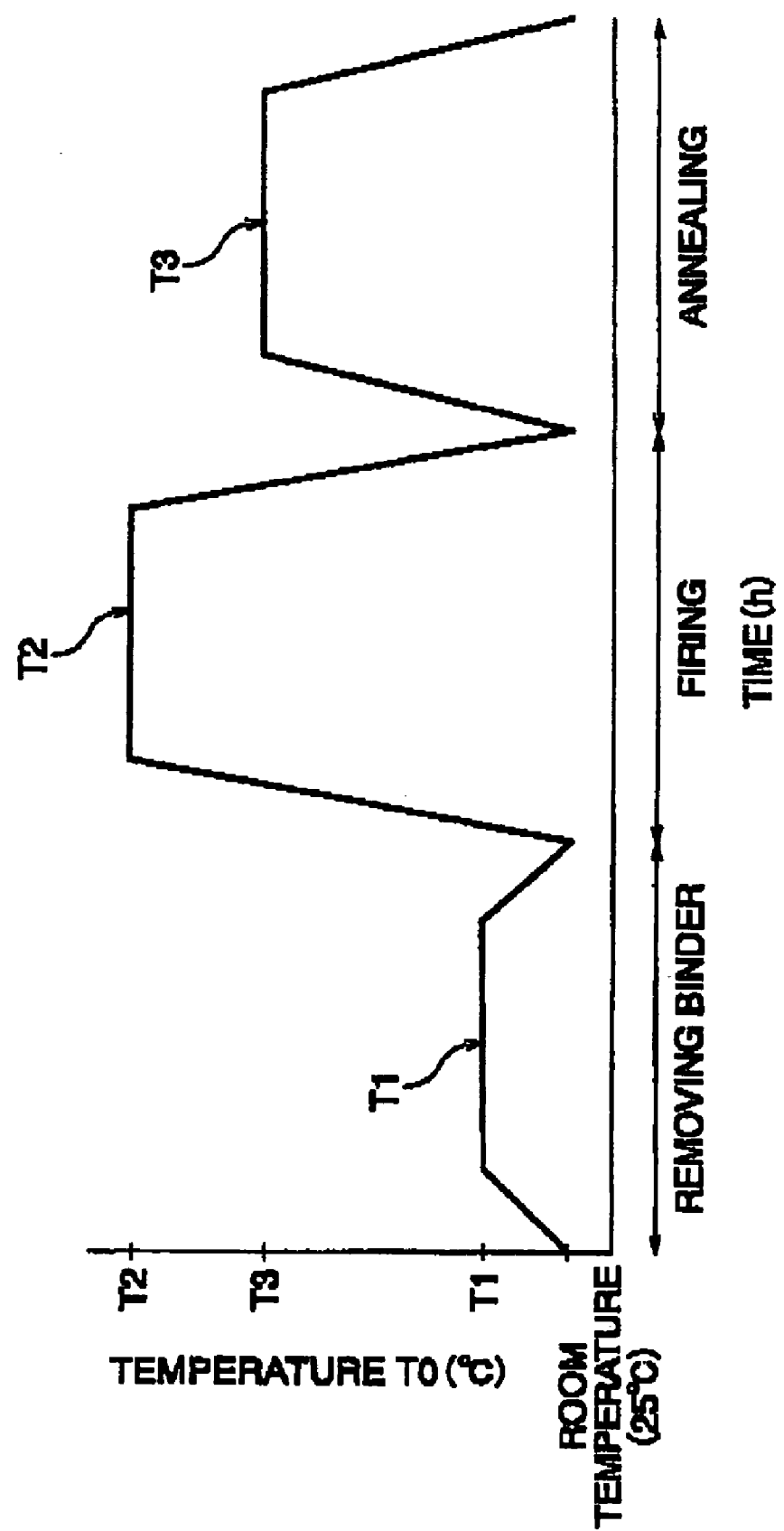
FIG. 3 is a graph indicating each temperature change at removing binder treatment, firing, and annealing in Examples.

(3) Next, the binder is removed from the obtained green tip. Process of removing the binder is, for instance, as shown in FIG. 3, raising atmospheric temperature T0 with prescribed rate of rise from room temperature (25° C.) to the holding temperature T1 which removes binder, holding the temperature T1 for prescribed time, then, reducing the temperature with prescribed rate of decline.

In the present embodiment, the rate of rise is preferably 5 to 300° C./hour, more preferably 10 to 100° C./hour.

Holding temperature T1 when removing the binder is preferably 200 to 400° C., more preferably 220 to 380° C. The holding time of T1 is preferably 0.5 to 24 hours, more preferably 2 to 20 hours.

The rate of decline is preferably 5 to 300° C./hour, more preferably 10 to 100° C./hour.

Treatment atmosphere when removing binder is preferably air or reduced atmosphere. Atmospheric gas when at reduced atmosphere is preferably moistened mixed gas of $N_2$ and $H_2$. Oxygen partial pressure under the reduced atmosphere is preferably $10^{45}$ to $10^{-5}$ Pa. When the oxygen partial pressure is excessively low, the effect of removing binder decreases and when excessively high, internal electrode layers tend to oxidize.

(4) Next, green tip is fired. Process of firing the green tip is, for instance, as shown in FIG. 3, raising atmospheric temperature T0 with prescribed rate of rise from room temperature (25° C.) to the holding temperature for firing T2, holding the temperature T2 for prescribed time; then, reducing the temperature with prescribed rate of decline.

In the present embodiment, the rate of rise is preferably 50 to 500° C./hour, more preferably 100 to 300° C./hour.

Holding temperature for firing T2 is preferably 1100 to 1350° C. and more preferably 1100 to 1300° C. The holding time T2 is preferably 0.5 to 8 hours, more preferably 1 to 3 hours. When T2 is excessively low, even when the holding time of T2 is made longer, densification becomes insufficient, and when excessively high, breakage of the electrode by abnormal sintering in internal electrode layer, deterioration of the capacity-temperature characteristics due to dispersion of the conductive materials forming the internal electrode layers, and reduction of the dielectric ceramic composition composing dielectric layer may tend to occur.

The rate of decline is preferably 50 to 500° C./hour, more preferably 150 to 300° C./hour.

Treatment atmosphere when firing is preferably reduced atmosphere. Atmospheric gas when at reduced atmosphere is preferably moistened mixed gas of $N_2$ and $H_2$. Particularly, when firing, after raising temperature to T1; holding temperature of removing binder, under $N_2$ gas or moistened N2 gas atmosphere, it is preferable to further raise temperature with changing atmosphere. Then, after declining temperature to T3 holding temperature of annealing, it is preferable to change atmosphere again to $N_2$ gas or moistened $N_2$ gas, and to further decline the temperature.

The oxygen partial pressure under the firing atmosphere is preferably $6 \times 10^{-8}$ to $10^{-4}$ Pa. When the oxygen partial pressure is excessively low, breakage of the electrode by abnormal sintering of conductive material in internal electrode layer may occur, and when excessively high, internal electrode layers tends to oxidize.

(5) Next, when the green tip is fired under the reduced atmosphere, it is preferably followed by heat treatment (annealing). The annealing is a treatment reoxidizing dielectric layer and that characteristics of the final capacitor are obtained.

Annealing process is, for instance, as shown in FIG. 3, raising atmospheric temperature T0 with prescribed rate of rise from room temperature (25° C.) to the holding temperature T3 of annealing, holding the temperature T3 for prescribed time, then, reducing the atmospheric temperature T0 with prescribed rate of decline.

In the present embodiment, the rate of rise is preferably 100 to 300° C./hour, more preferably 150 to 250° C./hour.

Holding temperature T3 of annealing is preferably 800 to 1100 ° C., more preferably 900 to 1100° C. the holding time of T3 is preferably 0 to 20 hours, more preferably 2 to 10 hours. When T3 is excessively low, oxidation of the dielectric layers 2 become insufficient, so the IR tends to become low or the IR lifetime tends to become shorter. When T3 is excessively high, not only are the internal electrode layers 3 oxidized and does the capacity fall, but also the internal electrode layers 3 end up reacting with the dielectric base material and deterioration of the capacity-temperature characteristic, a drop in the IR, and a drop in the IR lifetime tend to occur.

The rate of decline is preferably 50 to 500° C./hour, more preferably 100 to 300° C./hour.

Treatment atmosphere when annealing is preferably neutral atmosphere. Atmospheric gas when at neutral atmosphere is preferably moistened gas of N2. During the annealing, raising the temperature to the holding temperature T3 under $N_2$ gas atmosphere, the atmosphere can be changed and the atmosphere through the annealing process can all be moistened gas of $N_2$. Oxygen partial pressure under the annealing atmosphere is preferably $2\times10^{-4}$ to 1 Pa. When the oxygen partial pressure is excessively low, reoxidizing dielectric layer 2 become difficult and when high, the internal electrode layers 3 tend to oxidize.

In the present embodiment, the annealing may be consisting the raising temperature process and the declining temperature process. Namely, temperature holding time may be zero. In such case, the holding temperature T3 is equivalent to the highest temperature.

In the above treatment for removing the binder, firing, and annealing, it is sufficient to use a wetter or so to moisten the $N_2$ gas or mixed gas etc. In this case, the water temperature is preferably around 0 to 75° C.

The treatment for removing the binder, firing, and annealing may be performed either consecutively or partially.

The above each treatment form the capacitor device body 10 composed of sintered body.

(6) Next, external electrodes 4 are formed onto the obtained capacitor device body 10. The formation of the external electrodes 4 can be performed by following processes that are known in the art. The end faces of the obtained capacitor device body 10 composed of the mentioned sintered body is polished such as by barrel polishing or sand blasting, then, external electrode paste, usually including at least one element selected from Ni, Pd, Ag, Au, Cu, Pt, Rh, Ru, Zr etc. or their alloys, are baked or In-Ga alloys are applied onto both end faces. If necessary, the surfaces of the external electrodes 4 are plated to form covering layers.

Multilayre ceramic capacitor 1 as manufactured by the above method is implemented such as on plated print by soft soldering or so.

Above, an embodiment of the present invention was explained, but the present invention is not limited to this embodiment in any way. The invention may of course be worked in various ways within the scope of the gist of the invention.

For instance, although the above-mentioned embodiments exemplified multilayer ceramic capacitor 1 as multilayer ceramic electric device, the invention is not limited to the capacitor 1. The device can be any other thing.

In the above embodiment, treatment of removing binder, firing and annealing are performed separately. However, in the invention, at least 2 treatments can be done continuously. When the treatments are performed continuously, it is preferable that after removing binder treatment, atmosphere is changed without cooling, then, raising the temperature to the holding temperature T2 for firing and the firing is performed, followed by cooling to the holding temperature T3 of annealing and the annealing is performed.

EXAMPLES

Next, examples in further detail of the invention will be given to explain the present invention however the invention is not limited to these examples.

Preparing Dielectric Layer Paste

First, as dielectric material, PVB(polyvinyl butyral) resin as binder, DOP(dioctyl phthalate)as plasticizer, and ethanol as solvent were prepared. Dielectric material was produced by preparing $BaTiO_3$ having an average particle size of around 0.2 $\mu$m as main component, and 0.2 mole % of $MnCO_3$, 0.5 mole % of MgO, 0.3 mole % of $V_2O_5$, 2 mole % of $Y_2O_3$, 3 mole % of $CaCO_3$, 3 mole % of $BaCO_3$, 3 mole % of $SiO_2$ as subcomponent were prepared and wet mixed for 16 hours in the ball mill and dried.

Next, compared with the dielectric material, 10 wt % of binder, 5 wt % of plasticizer, 150 wt % of solvent were weighed, mixed by ball mill, and slurrying was performed to obtain dielectric layer paste.

Preparing Internal Electrode Layer Paste

Ni particles having an average particle size of 0.2 $\mu$m as conductive material, dielectric material for additives, ethyl cellulose resin as binder, and terpineol as solvent were prepared.

Dielectric material for additives including $BaTiO_3$ as main component material for additives which substantially has the same composition with dielectric material in said dielectric layer paste and subcomponent material for additives including $MnCO_3$, MgO, $V_2O_5$, $Y_2CO_3$, $CaCO_3$, $BaCO_3$ and $SiO_2$. $BaTiO_3$ as main component material for additives, for each sample, as mentioned in table 1 ignition loss and specific surface area (SSA) were varied. Average particle sizes were also recorded together with SSA.

Ignition loss values of main component material for additives as in Table 1 are weight change rates (units are %) after treated at 1200° C. and retained for 10 minutes, compared to standard weight which is weight of main component material for additives that are heat treated (treatments or heating from room temperature to 1200° C. with rate of rise at 300° C./hour and retailing temperature at 1200° C. for 10 minutes) at 200° C. In the table, when it states "−5.00%", it indicates 5.00% decrease, e.g. when weight at 200° C. is 100, weight at 1220° C. after 10 minutes become 95. Following is computable equation.

Weight change rate=$((W_{after}-W_{before})/W_{before})\times 100$

In the equation, $W_{after}$ is weight after heat treated at 1200° C. for 10 minutes, and $W_{before}$ is weight at heat treatment of 200° C.

Further, SSA of main component material for additives as in Table 1 are calculated value using Nitride adsorption method(BET method).

Next, compared with the conductive material, 20 wt % of dielectric material for additives were added. Compared with the mixed powder of conductive material and dielectric material for additives, 5 wt % of binder, 35 wt % of solvent were weighed and added, mixed by ball mill, and slurrying was performed to obtain internal electrode layer paste.

Preparing Multilayer Ceramic Tip Capacitor Samples

Multilayer Ceramic Tip Capacitor 1 as shown in FIG. 1 was prepared by utilizing the obtained dielectric layer paste and the internal electrode layer past as following.

Dielectric layer paste was applied onto the PET film by doctor-blade method by prescribed thickness and then by drying them, 1.5 $\mu$m thickness of ceramic green sheet was formed. In the present embodiment, the mentioned ceramic green sheets were considered to be the first green sheet and a plural number of the sheet were prepared.

On the obtained first green sheet, internal electrode past was formed by screen printing method with the prescribed pattern, then, ceramic green sheet having 1.5 $\mu$m thickness of electrode pattern was obtained. In the present embodiment, the mentioned ceramic green sheets were considered to be the second green sheet and a plural number of the sheet were prepared.

Green sheet group was formed by laminating the first green sheets to the thickness of 300 $\mu$M. Then, 5 sheets of the second green sheets were stacked on the green sheet group. And further, on the second green sheets, the green sheet group was formed by laminating the first green sheets in the same way as mentioned above. Then, by heated at BOC and pressurized by 1 ton/cm green multilayer body was obtained.

Next, the obtained multilayer body was cut to the site of 3.2 mm long×1.6 mm wide×11.0 mm height, removing binder treatment, firing and annealing under the below mentioned condition and then, the sintered body was obtained. Graph showing each temperature change at removing binder treatment, firing and annealing is shown in FIG. 3.

Removing binder was performed under the conditions of rising temperature rate of 30° C./hour, holding temperature T1 of 250° C., holding time of 8 hours, falling temperature rate of 200° C./hour and treatment atmosphere of air atmosphere.

Firing was performed under the conditions of rising temperature rate of 200° C./hour, holding temperature T2 of "° C." as in Table 1, holding time of 2 hours, failing temperature rate of 200° C./hour and treatment atmosphere of reduced atmosphere(atmosphere prepared by moisturizing mixed gas of $N_2$ and 0.5 to 5 weight % of $H_2$) and oxygen partial pressure of $10^{-7}$ Pa.

Annealing was performed under the conditions of rising temperature rate of 200° C./hour, holding temperature T3 of 1050° C., holding time of 2 hours, falling temperature rate of 200° C./hour and treatment atmosphere of reduced atmosphere(prepared by passing $N_2$ gas through water vapor under oxygen partial pressure of 0.1 Pa).

For moisturizing gas when firing and annealing, wetter was used at water temperature of 20° C.

The obtained sintered body was bladed from end faces of internal electrode layers till the layers become half long and the bladed plane was mirror bladed by diamond paste. Afterward, thermal etching treatment (rate or rise and rate of fall: 300° C./hour, holding temperature: 1200° C. and holding time: 10 minutes) was performed on the plane and particles of the plane were observed by scanning electron microscope (SEM).

Figure 4:
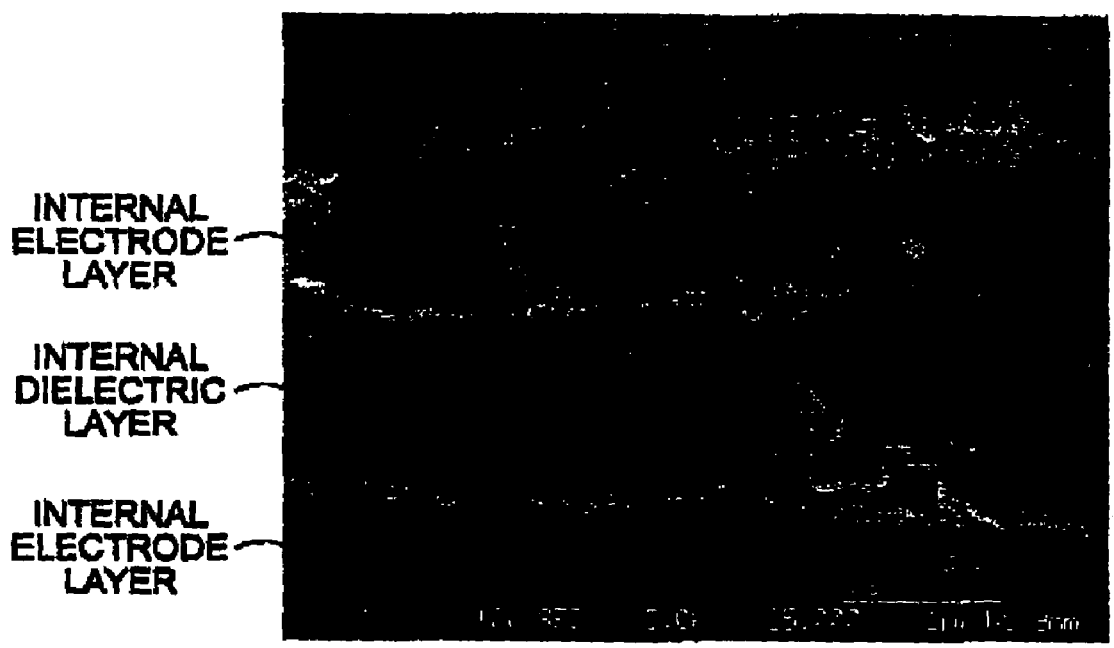
FIG. 4 is a SEM picture of sample 1 as in Example, indicating sectional state of sintered body after thermal etching.
Figure 5:
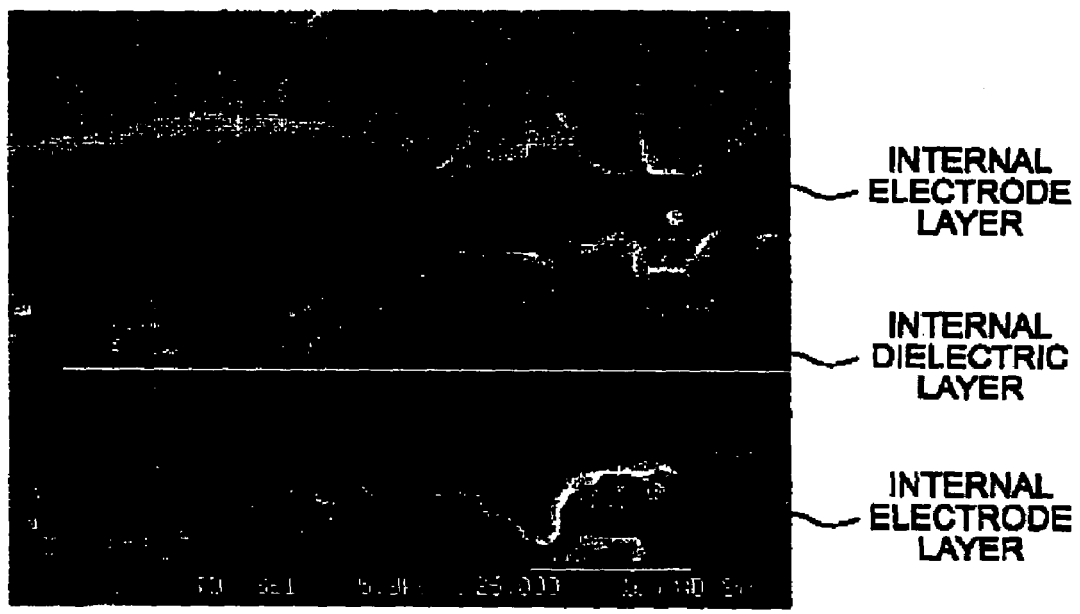
FIG. 5 is a SEM picture of sample 8 as in Reference Example, indicating sectional state of sintered body after thermal etching.
Figure 6:
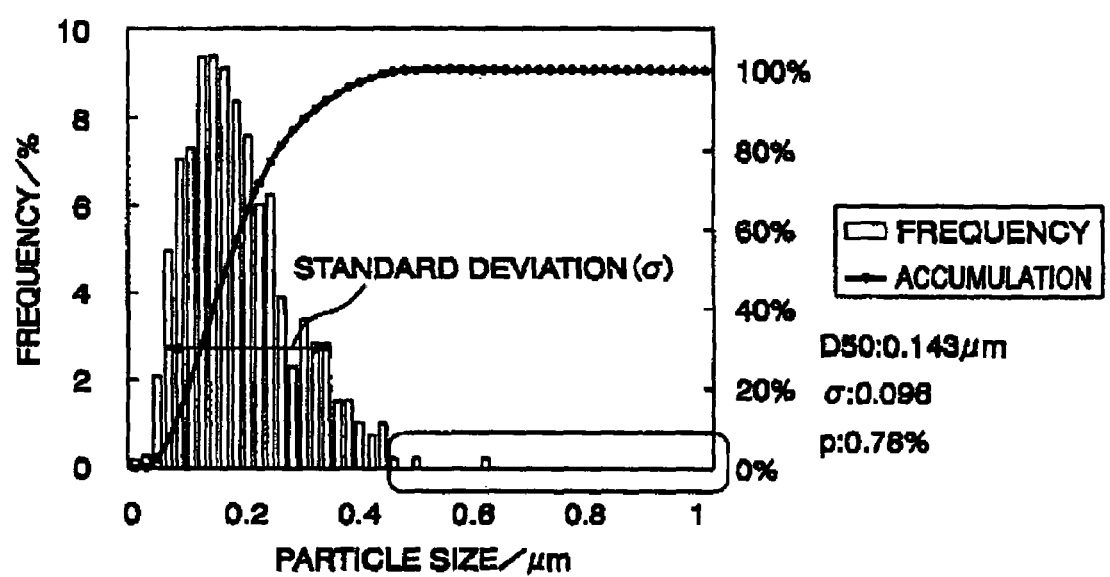
FIG. 6 is a graph indicating relations between particle sizes and frequencies of dielectric particles composing internal dielectric layer as in sample 1 of Example.

FIG. 4 and FIG. 5 show SEM pictures of sample 1 and sample 8 respectively, indicating sectional state of sintered body after the thermal etching. FIG. 6 shows a graph indicating relations between particle sizes and frequencies of dielectric particles composing internal dielectric layers.

Sectional area (S) of the particles were calculated from the observed picture. However, object positions for observation are in the range of 100 $\mu$m×100 $\mu$m including center of the bladed plane, and 5 views (about 90 contacting dielectric particles per 1 view were observed) are optionally selected from the range. Formation of the dielectric particles are considered to be sphere and particle diameter (d) of the dielectric particles are calculated from the following equation. Particle diameter (d)=2×($\sqrt{(S/n)}$)×1.5. The obtained diameters are arranged in histogram and the diameter wherein accumulation of its frequencies is 50% is considered to be an average particle (D50).

Standard deviations ($\sigma$) are calculated from following equation.

$$\text{Standard deviation } (\sigma) = \sqrt{(((n\Sigma x^2) - (\Sigma x)^2)/n(n-1))}$$

Further, ratio p was also calculated from the above observed results. The p is the ratio of contacting dielectric particles (coarse particles), having an average particle size which is at least 2.25 times larger than an average particles size D50a of the contacting dielectric particles 2a, existing in the contacting dielectric particles 2a included in the dielectric layers.

Measurement methods of electric characteristics were as follow. The end faces of the obtained sintered body were bladed by sandblasting, In-Ga alloys were applied, sample electrodes were formed and multilayer ceramic tip capacitor sample was obtained. The capacitor sample size was 3.2=length×1.6 mm width×1.0 mm height; the thickness of internal dielectric layer 2 was about 1.0 $\mu$m, the thickness of internal electrode layer 3 was 1.2 $\mu$m.

DC bias of the obtained capacitor samples were evaluated. DC bias of the capacitor was measured by standard temperature of 20° C. by digital LCR meter (4274A, YHP made) under the condition of 120 Hz frequency, 0.5 Vrms/$\mu$m OSC, and 1.6V/$\mu$m bias voltage. An valuation basis, it was considered to be good when DC bias was at least −6.20. Results are shown in table 1.

TABLE 1

| | Main Component Material for Additives ($BaTiO_2$) | | Firing Temp. | | | | | |
|---|---|---|---|---|---|---|---|---|
| Sample | Ignition Loss % | SSA cm²/g | T2 ° C. | D50 $\mu$m | $\sigma$ | $\rho$ % | DC bias | Results |
| 1 | −3.58 | 12.8 | 1240 | 0.162 | 0.098 | 0.78 | −5.85 | ○ |
| 2 | −2.50 | 15.2 | 1240 | 0.179 | 0.103 | 2.16 | −5.76 | ○ |

TABLE 1-continued

| | Main Component Material for Additives (BaTiO$_2$) | | Firing Temp. | | | | | |
|---|---|---|---|---|---|---|---|---|
| Sample | Ignition Loss % | SSA cm$^2$/g | T2 °C. | D50 μm | σ | ρ % | DC bias | Results |
| 3 | −3.27 | 18.4 | 1240 | 0.163 | 0.103 | 2.39 | −5.72 | ○ |
| 4 | −2.35 | 18.6 | 1240 | 0.153 | 0.104 | 2.76 | −5.82 | ○ |
| 5 | −3.72 | 26.9 | 1240 | 0.170 | 0.121 | 3.86 | −5.86 | ○ |
| 6 | −6.15 | 14.2 | 1240 | 0.218 | 0.132 | 7.24 | −5.94 | ○ |
| *7 | −7.22 | 30.2 | 1240 | 0.182 | 0.145 | 8.12 | −6.14 | X |
| *8 | −8.3 | 26.6 | 1240 | 0.256 | 0.150 | 20.23 | −6.38 | X |

*Comparative Examples

As shown in Table 1, samples 7 and 8 not in the range of D50≦0.25 μm and σ≦0.14 are inferior in DC bias. Particularly, as shown in FIG. 5, at internal dielectric layer, unevenness can be seen in particle size of many dielectric particles and some coarse particles at internal dielectric layer are identified. To the contrary, all samples 1 to 6 in the range of the present invention were confirmed to be superior in DC bias. Particularly in sample 1, as shown in FIG. 4 and FIG. 6, at internal dielectric layer, unevenness could be seen in particle size of few dielectric particles and coarse particles at internal dielectric layer were hardly identified.

Further, a tendency was confirmed from Table 1 that the larger σ is the higher p is.

What is claimed is:

1. A multilayer ceramic capacitor comprising internal electrode layers and dielectric layers having thickness to at most 3.5 μm wherein;

the dielectric layers comprising dielectric particles contacting the internal electrode layers (contacting dielectric particles) and dielectric particles not contacting the internal electrode layers (non-contacting dielectric particles); and when an average particle size of an entire plural number of dielectric particles included in the dielectric layers is D50, and stranded deviation for particle size range of the contacting dielectric particles is σ, the multilayer ceramic capacitor satisfy the following equations, D50≦0.25 μm and σ≦0.14.

2. The multilayer ceramic capacitor as set forth in claim 1 wherein; when an average particles size of the contacting dielectric particles is D50a, and ratio of contacting dielectric particles (coarse particles) having an average particle size which is at least 2.25 times larger than said D50a, existing in the contacting dielectric particles included in the dielectric layers is p, the multilayer ceramic capacitor satisfy the following equation; p≦8.00%.

* * * * *